H. H. STURGIS.
FISHING TACKLE.
APPLICATION FILED MAY 1, 1920.

1,371,128.

Patented Mar. 8, 1921.

INVENTOR.
H. H. Sturgis.
BY
ATTORNEY.

UNITED STATES PATENT OFFICE.

HENRY H. STURGIS, OF KEY WEST, FLORIDA.

FISHING-TACKLE.

1,371,128.  Specification of Letters Patent.  Patented Mar. 8, 1921.

Application filed May 1, 1920. Serial No. 378,274.

*To all whom it may concern:*

Be it known that I, HENRY H. STURGIS, a citizen of the United States, residing at Key West, in the county of Monroe and State of Florida, have invented certain new and useful Improvements in Fishing-Tackle; and I do hereby declare the following to be a full, clear, and exact description of the invention, such as will enable others skilled in the art to which it appertains to make and use the same.

This invention relates to fishing tackle and it consists in the novel features hereinafter described and claimed.

An object of the invention is to provide a tackle which includes a plurality of hooks mounted upon an annular support, as for instance a ring, there being means provided for swinging the hooks upon the support when the fish swallows a hook whereby the pointed end of the hook is directed into the fish when it attempts to pull away and consequently the pointed end of the hook is firmly engaged in the fish in a manner to prevent the fish from getting off of the hook.

In the accompanying drawing:—

Figure 1:
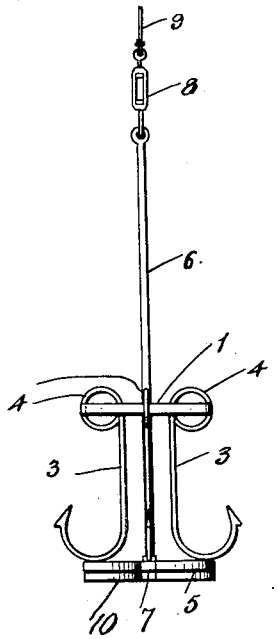
Figure 1 is a side elevation of the fishing tackle.
Figure 3:
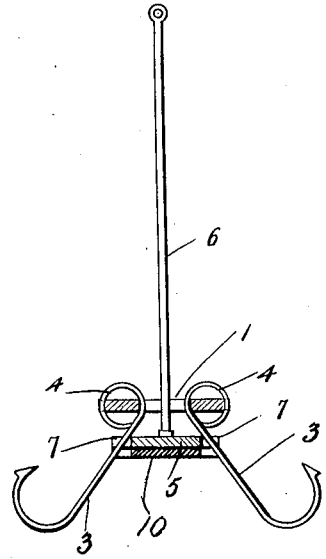
Figs. 3 and 4 are detailed views of the invention.
Figure 2:
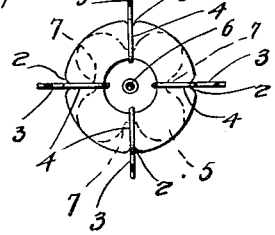
Fig. 2 is a top plan view of the same.
Figure 4:
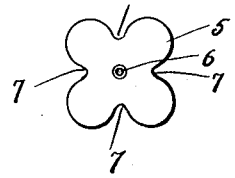

The fishing tackle comprises a ring 1 preferably of metal, and which is provided at spaced intervals with grooves 2. Hooks 3 are provided with loops 4 which are extended around the ring 1 transversely and partially received in the groove 2 thereof. A disk 5 is mounted upon a stem 6 and the stem is secured to the disk at the center thereof and disposed in a plane at a right angle to the plane of the disk. The disk 5 is provided at its edge with a series of notches 7 which correspond in number with the number of the hooks mounted upon the ring 1.

The swivel joint 8 is attached to the end of the stem 7 and may be connected with a line 9 in a usual manner.

The stem 6 passes centrally through the ring 1 and the disk 5 lies between the hooks 3. When the hooks are baited and the tackle is in use the hooks hang approximately vertically from the ring and when a fish swallows one of the hooks and the bait thereon, the fisherman pulls the line 9 whereby the stem 6 is moved in an upward direction the ring 1 and the edges of the disk 5 come in contact with the inner sides of the shanks of the hooks and these shanks move into the notches 7 of the disk. As the disk continues to move toward the ring 1 the hooks are swung outwardly. The hook which has been swallowed by the fish is so disposed that its pointed end is directed in the direction opposite from that in which the fish is pulling away from the hook. Consequently the pointed end will be projected into the wall of the mouth of the fish and the fish will be captured inasmuch as it cannot shake the hook out of its mouth.

The weight 10 secured to the under face of the disk 5 serves to retain the shaft 6 in approximately perpendicular position until one of the hooks 3 is pulled by the victim.

Having described the invention what is claimed is:

A fishing tackle comprising a ring provided at intervals with grooves, hooks having loops which lie in the grooves, a stem passing through the ring, and a disk mounted upon the stem and adapted to engage the inner side of the hooks and swing the same with relation to the ring.

In testimony whereof I affix my signature in presence of two witnesses.

HENRY H. STURGIS.

Witnesses:
J. LANCELOT LESTER,
W. H. MALONE.